United States Patent
Lawson et al.

(10) Patent No.: US 9,853,920 B2
(45) Date of Patent: Dec. 26, 2017

(54) SYSTEMS AND METHODS FOR PERFORMING PACKET REORDER PROCESSING

(71) Applicant: Cisco Technology, Inc., San Jose, CA (US)

(72) Inventors: Matthew Todd Lawson, Grass Valley, CA (US); Sai Kishore Vavilala, Milpitas, CA (US); Jason Allen Marinshaw, Santa Clara, CA (US); Stephen Patrick Kolecki, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 175 days.

(21) Appl. No.: 14/833,251

(22) Filed: Aug. 24, 2015

(65) Prior Publication Data

US 2017/0063733 A1 Mar. 2, 2017

(51) Int. Cl.
*H04L 12/801* (2013.01)
*H04L 12/879* (2013.01)
*H04L 12/861* (2013.01)
*H04L 12/863* (2013.01)
*H04L 12/883* (2013.01)

(52) U.S. Cl.
CPC .......... *H04L 49/901* (2013.01); *H04L 47/34* (2013.01); *H04L 47/624* (2013.01); *H04L 49/9015* (2013.01); *H04L 49/9042* (2013.01)

(58) Field of Classification Search
CPC .......................... H04L 49/901; H04L 49/9042
See application file for complete search history.

(56) References Cited

U.S. PATENT DOCUMENTS

| | | | | |
|---|---|---|---|---|
| 5,274,641 A | * | 12/1993 | Shobatake | H04L 12/5602 370/392 |
| 5,289,469 A | * | 2/1994 | Tanaka | H04L 29/06 370/469 |
| 5,299,313 A | * | 3/1994 | Petersen | G06F 13/128 709/212 |
| 5,787,255 A | * | 7/1998 | Parlan | H04L 29/06 370/349 |
| 6,088,391 A | * | 7/2000 | Auld | H04N 19/61 348/716 |
| 6,356,951 B1 | * | 3/2002 | Gentry, Jr. | H04L 69/161 709/217 |

(Continued)

*Primary Examiner* — Parth Patel
(74) *Attorney, Agent, or Firm* — Meunier Carlin & Curfman LLC

(57) ABSTRACT

A method for performing packet reorder processing is disclosed. The method comprises receiving, at a packet receive buffer, a data packet, the packet receive buffer comprising a plurality of N-sized pages. The method also comprises storing the received data packet across a plurality of pages of the packet receive buffer. The method further comprises writing, at storage of each of the plurality of pages, a pointer to a next page in which a subsequent portion of the data packet is stored. The method also comprises transmitting the pointer to a ring buffer. The method further comprises calculating an offset to the ring based on a sequence number of the corresponding packet, and storing the pointer to a first page in the calculate offset of the ring buffer.

14 Claims, 12 Drawing Sheets

(56) References Cited

U.S. PATENT DOCUMENTS

| | | | | |
|---|---|---|---|---|
| 6,470,017 B1* | 10/2002 | Otaka | ............... | H04J 3/24 |
| | | | | 370/395.71 |
| 6,832,261 B1* | 12/2004 | Westbrook | ......... | H04L 12/5601 |
| | | | | 370/394 |
| 7,100,020 B1* | 8/2006 | Brightman | ............ | H04L 49/10 |
| | | | | 709/231 |
| 7,643,486 B2* | 1/2010 | Belz | ................... | H04L 12/5693 |
| | | | | 370/392 |
| 7,965,708 B2* | 6/2011 | Cohen | .................. | H04L 47/32 |
| | | | | 370/389 |
| 2004/0255227 A1* | 12/2004 | Borsum | ................ | G06F 5/065 |
| | | | | 714/790 |
| 2007/0103474 A1* | 5/2007 | Huang | ..................... | G06T 1/20 |
| | | | | 345/506 |
| 2008/0313367 A1* | 12/2008 | Machiya | ......... | G11B 20/10527 |
| | | | | 710/52 |
| 2009/0232140 A1* | 9/2009 | Kitajima | ............. | H04L 49/1523 |
| | | | | 370/394 |
| 2009/0290592 A1* | 11/2009 | Konishi | ................ | H04L 49/90 |
| | | | | 370/412 |
| 2010/0046519 A1* | 2/2010 | Dan | ....................... | H04L 47/10 |
| | | | | 370/394 |
| 2012/0185620 A1* | 7/2012 | Cheng | ................ | H04N 19/176 |
| | | | | 710/52 |
| 2014/0237072 A1* | 8/2014 | Satoh | ..................... | H04L 69/16 |
| | | | | 709/217 |
| 2015/0110103 A1* | 4/2015 | Kullangal Sridhara | ........... | H04L 47/6255 |
| | | | | 370/352 |
| 2016/0034393 A1* | 2/2016 | Wu | ...................... | G06F 3/0608 |
| | | | | 711/4 |
| 2016/0191404 A1* | 6/2016 | Srinivasan | ........... | H04L 47/527 |
| | | | | 370/359 |

* cited by examiner

SYSTEMS AND METHODS FOR PERFORMING PACKET REORDER PROCESSING

TECHNICAL FIELD

The present disclosure relates generally packet flow processing in network equipment and, more particularly, to systems and methods for performing packet reorder processing in network routers or switches, particularly those used in multi-hop, load-balanced networks.

BACKGROUND

Most modern networking systems transmit amounts of data between a source and destination by breaking large blocks of data into several smaller blocks, each of which can be more efficiently and reliably transported through the network than if the data were delivered as a single block. For example, large blocks of data generally consume more processing resources to deliver across the network. Consumers and designers of these systems typically desire high reliability and increased performance at a reasonable price. A commonly used technique for helping to achieve these goals is for these systems to provide multiple paths between a source and a destination. Packets of information are then dynamically routed and distributed among these multiple paths. It is typically more cost-effective and technically feasible to provide multiple slower rate links or switching paths, than to provide a single higher rate path. Such designs also achieve other desired performance characteristics. Furthermore, because there typically exists several physical and/or logical communication paths between a source node and a destination node, a large block of data can be divided into packets of smaller size, which can then be divided between the multiple routes and transmitted to the destination faster than if the large blocks were transmitted to the destination over the same link. When the individual packets arrive at the destination node, the smaller packets are reassembled to restore the large block of data into its original (pre-segmented) form.

When packets from a single stream are sent through such a packet switching system, they may arrive out of order at their destinations, such as an output port of a packet switching system. In this situation, the packets must be re-ordered. Similarly, when a packet is decomposed into multiple packets which are sent to a destination, the packet must be reassembled. In some systems, one or both resequencing and/or reassembly of packets might be required. The increasing rates of traffic to be sent through a packet switching system and the corresponding number of packets which must be resequenced and/or reassembled is resulting in higher demands on the resequencing and reassembly processes. In other words, the resequencing and/or reassembly processes must be performed at corresponding higher rates. However, it is not always possible for traditional methods and mechanisms to operate at these higher rates. For example, a traditional resequencing and/or reassembly mechanism might be limited by the bandwidth of memory used in the resequencing and/or reassembly processes.

DETAILED DESCRIPTION OF THE EXAMPLE EMBODIMENTS

Overview

In accordance with one aspect, the present disclosure is directed to a method for performing packet reorder processing is disclosed. The method comprises receiving, at a packet receive buffer, a data packet, the packet receive buffer comprising a plurality of N-sized pages. The method also comprises storing the received data packet across a plurality of pages of the packet receive buffer. The method further comprises writing, at storage of each of the plurality of pages, a pointer to a next page in which a subsequent portion of the data packet is stored. The method also comprises transmitting the pointer to a ring buffer. The method further comprises calculating an offset to the ring based on a sequence number of the corresponding packet, and storing the pointer to a first page in the calculated of the ring buffer.

Example Embodiments

Figure 1:
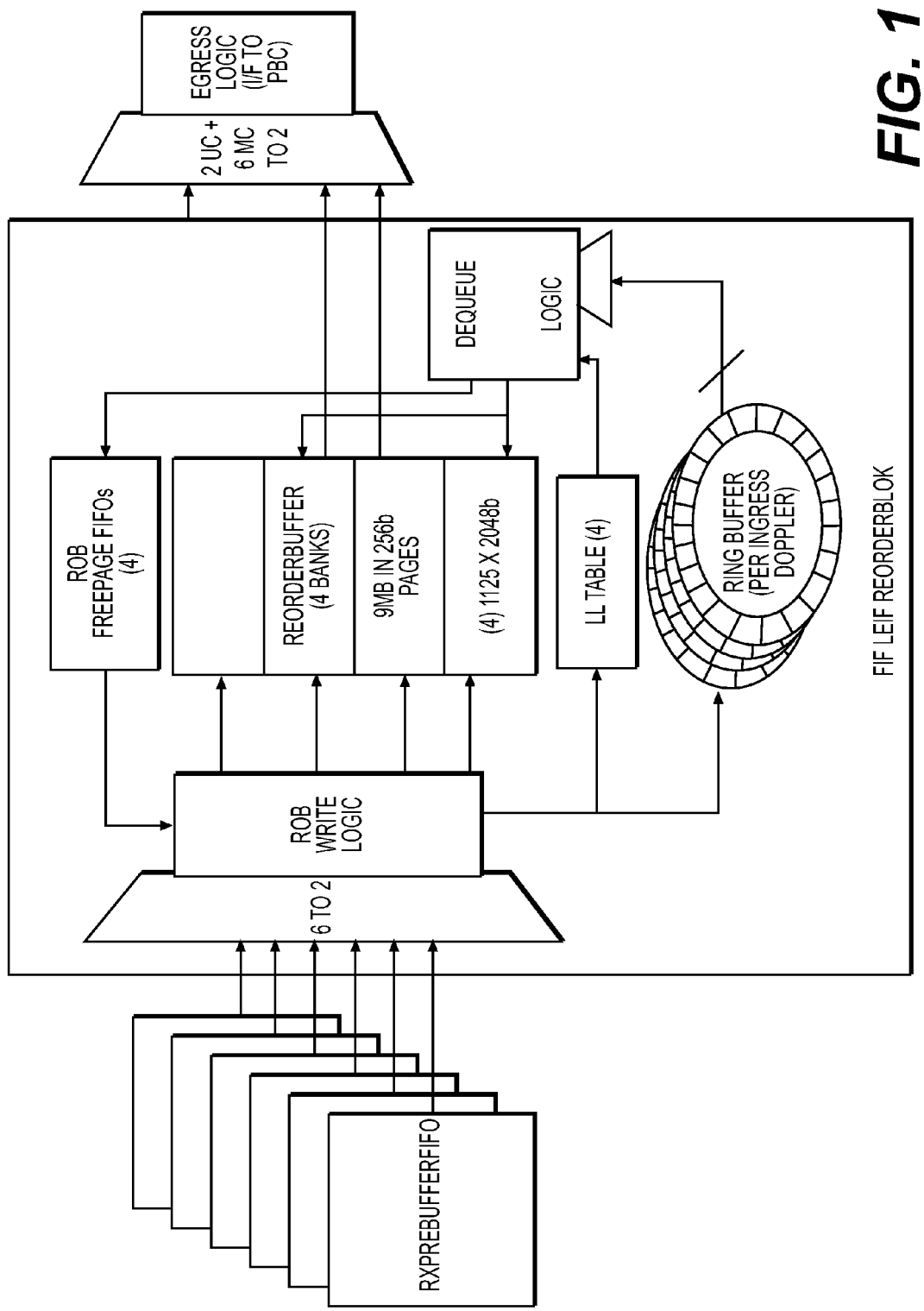
FIG. 1 is a block diagram of an exemplary reorder block system, consistent with certain disclosed embodiments.

FIG. 1 is a block diagram of an exemplary reorder block system, consistent with certain disclosed embodiments. As illustrated in FIG. 1, the reorder block (ROB) system may comprise, among other things, ROB Write logic. Frames may be accepted from the CheckStrip block. The packets within the frames are removed, the Frame header is recreated or extracted, and the packet is written in to the ROB. All packets stored in the ROB are restored to their original state: final Frame Descriptor and CRC32. As the packets are written in to the ROB, a linked list of the pages used is created.

The reorder block may also comprise a Reorder Buffer used to store all packets/segments. The reorder block contains the associated logic and the reorder buffer.

The reorder block may further comprise a Linked List Table (LLT) to store the list of pages consumed by a packet or series of packets from a superframe. A superframe groups bit frames, such as twelve of one hundred and ninety bit frames, together and designates the framing bits of the even numbered frames as signaling bits. Each entry in the LLT stores 1 to 6 ROB page pointers plus a pointer to the next LLT entry for that packet if the linked list extends past 6

ROB pages. Although in this example six pointers can be used, in other embodiments more or fewer can be used.

The reorder block may also include one or more ring buffers per packet source. Each Ring buffer is used to store pointers to the top of a linked list for a packet or series of packets in the LLT. The offset in to the ring buffer is based on the sequence number of the packet or superframe. The offset is calculated by subtracting the expected sequence number from the received sequence number. For example, if the received sequence number is 20, and the current sequence number the Ring Buffer is searching for is 4 at address 200, the LLT address of the received frame is written to address (200+(20−4))=216.

The reorder block may further comprise ReOrder dequeue logic. When the next sequence number in the ring buffer is received, the pointer is loaded in to the ReOrder Dequeue Logic (RDL). The RDL pipelines the read requests to the LLT & ROB and queues the packets to the Egress Logic along with queue allocation related information for the queue allocationPacketInterface.

Operational Overview

Due to the load balancing performed by the ingress logic of the FIF and possibly in the fabric, the packets traversing the fabric may arrive at the egress section of the FIF out of order. Segments of a packet may not arrive in order, and there may be packets from other sources that split the packet flow. The ReOrderBlock is the higher level construct that contains all packet reorder logic.

The reorder block restores the original order of packets returning to the packet buffer after traversal across the fabric complex. Packet delivery to the packet buffer is guaranteed to follow the original order from which the source packet buffer delivered the packets to the source FIF. The reorder block does not distinguish between SwitchE core #, COS, or front end port# (dLDI). In other words, the FEIF does not prioritize flows.

Sequence Number:

The Reorder block uses a 16b sequence number added by the ingress FIF as the method of performing reorder. The sequence number is incremented for every frame that is destined for an egress switch. The FIF reorder method is greatly reduced in complexity by using a separate sequence number that tracks up to 20 flows. Instead of tracking (#source switchE (20)*Core # (2)*COS level (8)*port count (41)=13120) separate sequence number flows, only the source switch is tracked, or 20 flows. The reorder requirement goal is achieved: Packets are delivered to the packet buffer in the same order they arrived from the packet buffer on the far side of the fabric.

Each entity that travels across the fabric has a single sequence number associated with it. Once the frame is received by the FEIF and the contents are extracted, the entire block of data from the frame is connected with the single sequence number. Thus, a sequence number may pertain to a single packet, or a series of packets that were extracted from a superframe. This method of associating each fabric frame with a single sequence number allows for a simple reorder logic implementation via ring buffers.

Packet Extraction:

The entire content of a frame received from the fabric is removed and written in to the reorder buffer in its original state: Packets that arrive in a superframe or individually are removed from the frame as they are written in to the ROB. A new SFD (switch frame descriptor) is created for each packet as it is written in to the ROB.

Information associated with the packet such as the EOP/SOP/seqNum/dFI/sFI/bytecnt/etc. is stored in the ROB Control memory.

Since every packet in a superframe has the same sequence number, there is a field called "LastinSeries" in the ROB Control Memory that is used to flag the last packet for a given sequence number. For individual packets that did not arrive in a superframe, the LastinSeries (LIS) is set to 1. For all but the last packet in a superframe, the field is set to 0. The ROB write logic uses this field to terminate the linked list of the packets in the ROB from the same superframe. Additionally, the EOP/SOP/LIS fields are used to validate the linked list integrity.

Linked List:

Packet(s) in the ROB associated with a sequence number are described by a linked list. The linked list is stored in a table called the LinkedListTable. Each entry in LinkedListTable contains up to a certain number, such as 6, ROB page pointers. Each LLT entry contains 6 entries to simplify the traversal of the linked list. During packet dequeue, the LLT entries are fetched from the LLT one entry at a time and the next LLT entry is fetched while the ROB pages in the current entry are read.

Ring Buffer:

There is a ring buffer per source switch. The ring buffer is the same depth as the ReorderBuffer. The RingBuffer stores a pointer to the head of each linked list for a sequence number. The pointer is stored in the ring buffer at an address calculated by subtracting the received sequence number from the expected sequence number and adding the offset to the polled location address. For instance, assume the next sequence number expected from the source switch is 10 and the polling logic is looking at location 25 for that sequence number. A new linked list arrives with a sequence number of 13. The pointer to that linked list is stored at location (25+(13−10)=28. Once the FIF receives sequence numbers of 10-12, the linked list stored at location 28 will be dequeued.

As the RB is polling a location while it waits for a sequence number to arrive, a timer is monitoring the amount of time spent waiting. If the timer crosses a configurable threshold, the polling logic will increment the expected sequence number, move to the next location in the RingBuffer and flag a lost sequence number error.

The number of entries in the Ringbuffer is maintained. If the ring buffer does not contain any valid pointers, the polling timer is disabled. This prevents the RingBuffer from timing out on a location due to a normal gap in the packet flow, or at start up.

Once the polled location becomes valid, the LLT address stored at that location is removed and sent to the Read Logic for dequeuing.

ROB Read Logic:

Up to a given number M, such as 20, RingBuffer blocks present to the Read Logic a request to dequeue a linked list. The Read Logic round robins through all the requests and schedules the linked list to be dequeued. When a linked list is selected for dequeue, the entire linked list is traversed and all packets in the list are removed from the ReorderBuffer. Since the packets are associated with a single sequence number, the entire group of data in the frame must be dequeued in a single block.

The FIF does not reassemble segmented packets. When each segment is received, it is sent to the packet buffer for final assembly. The segments will be sent to the packet buffer in proper order.

Figure 2:
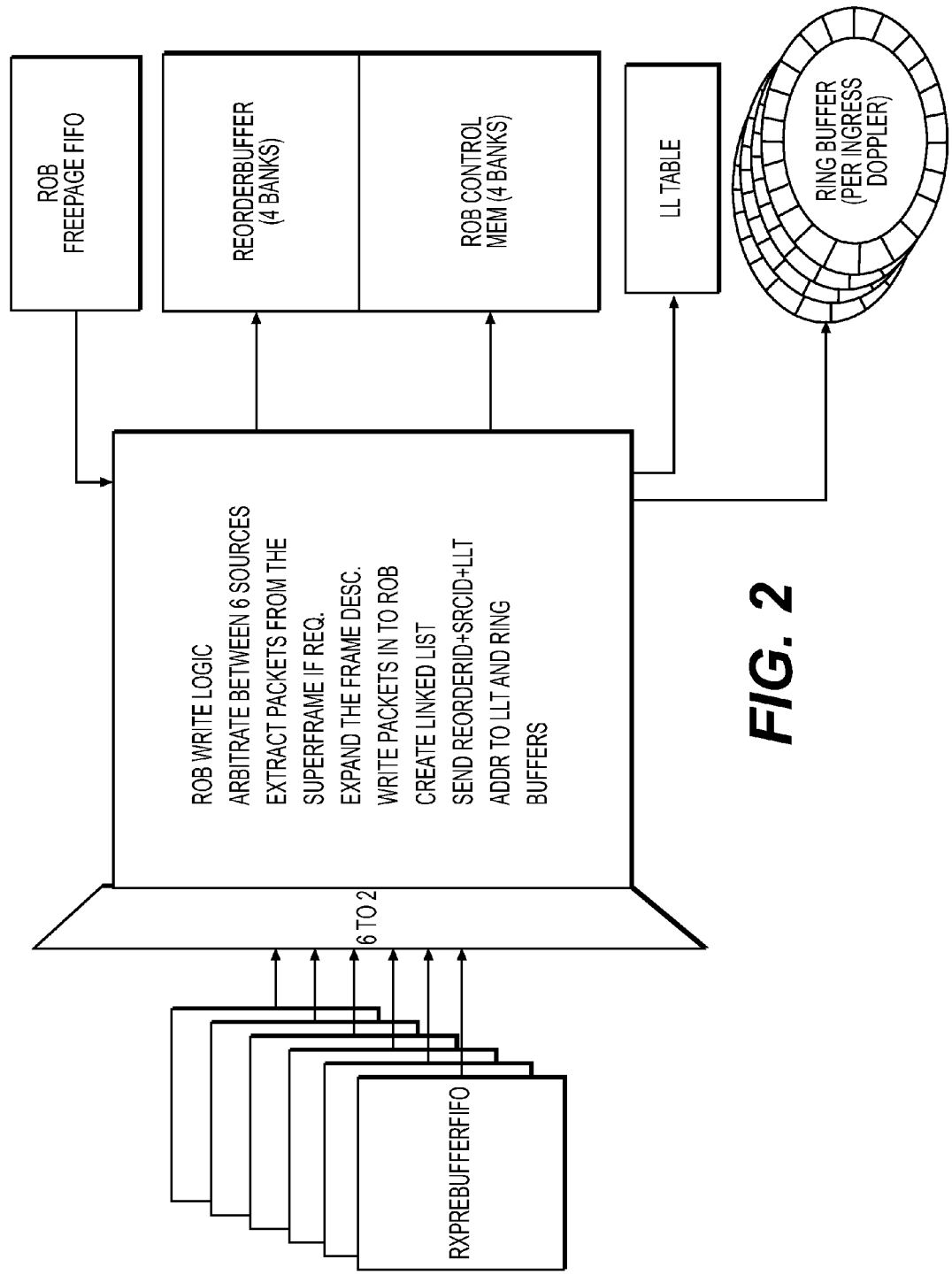
FIG. 2 is a block diagram of reorder buffer write logic, in accordance with certain disclosed embodiments.

FIG. 2 is a block diagram of reorder buffer write logic, in accordance with certain disclosed embodiments. ReOrder-Buffer Write Logic manages the packet write requests from the RXPreBuffer blocks. A give number, such as 6, RXPre-Buffer blocks raise requests to write. The frames from the PreBuffer are the original frames as received from the fabric. The header is intact and the frame has been checked for CRC.

The Write Logic removes the header and stores the required queue allocation information in the ROB Control Memory. The frame is then parsed to remove the packet, segment, or packets if it is a superframe. As the packets are extracted, a frame descriptor is either extracted from the frame directly (not compressed) or recreated from the compressed DSH. The packet CRC is then calculated and appended to the packet. The packet is stored in the ROB via pages retrieved from the FreePageFIFO, and the linked list is built. EOP/SOP/LIS information for the packets is stored in the ROB Control memory.

The write logic round robins between the requests from the RXPrebuffers. Free ROB Pages are requested from the 4 Free Page FIFOs continuously to maintain line rate. Packets are written in to 2 of the 4 ROB banks, alternating between 2 ROB buffers based on the buffers that are idle.

Packets are spread across 2 of 4 ROB banks to maintain constant depth in both buffers, and to prevent overutilization of a single buffer to allow maximum dequeue rate into the packet buffer. The ROB bank is determined by the idle ROB banks at the time of request. The ROB banks are single port RAMs and the read logic has priority. If there is no read operation at the time of the write, the ROB pages are selected based on the least used ROB bank.

As the pages for a packet or series of packets in a superframe are written in to the ROB, the ROB pointers are written in to the LLT entry. Up to a given number, such as 6, pointers are written to the entry, and then the complete entry is pushed to the LLT. If the linked list requires more than 1 LLT entry, the pointer to the next LLT entry will be added to the LLT entry pushed to the LLT table.

Figure 3:
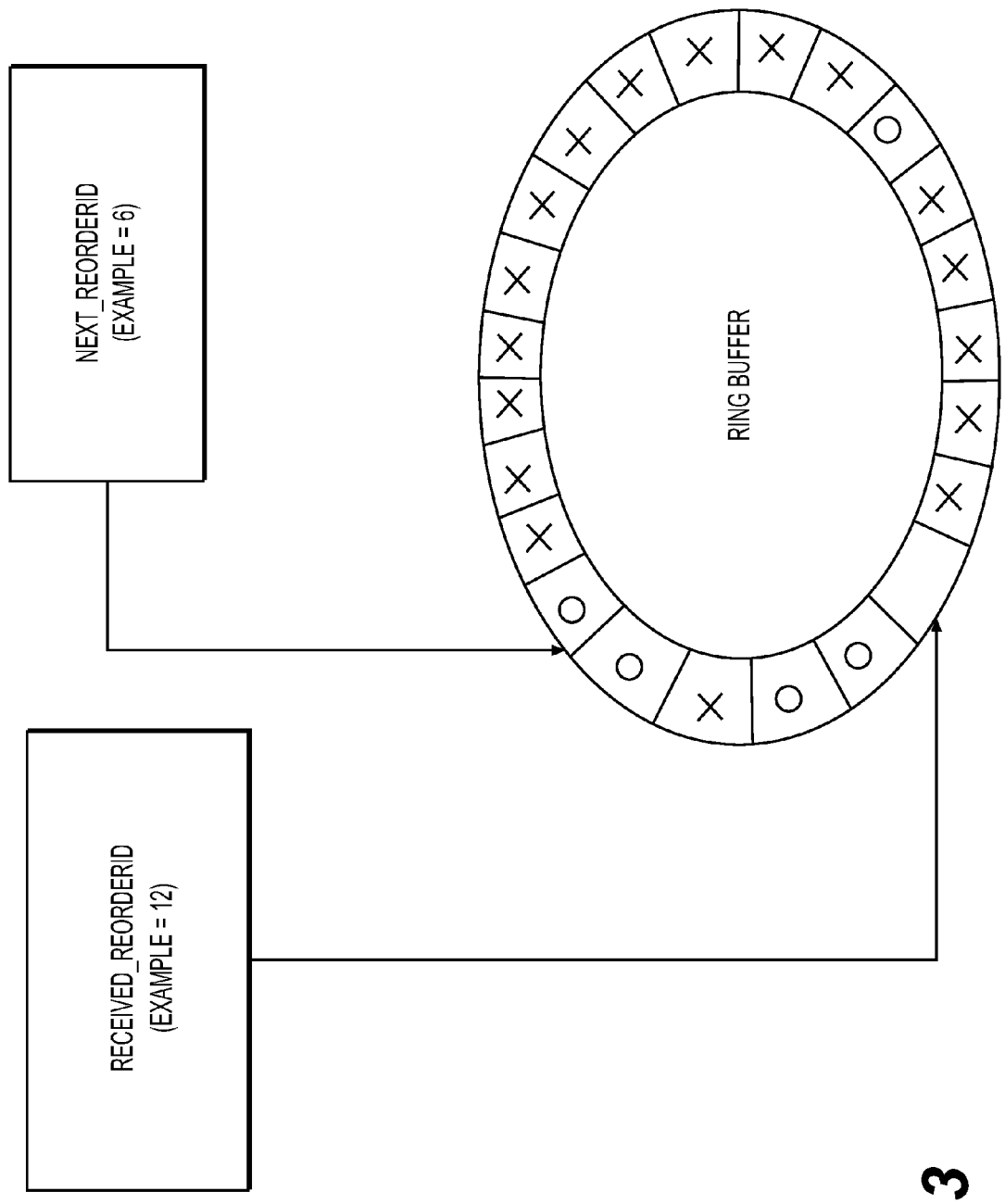
FIG. 3 is a block diagram of a ring buffer used in the reorder block, consistent with the disclosed embodiments.

FIG. 3 is a block diagram of a ring buffer used in the reorder block, consistent with the disclosed embodiments. The FIF contains a ring buffer per source ID. The ring buffer performs the reorder function by storing the first pointer of the linked list for a packet(s) for a given sequence number from a source switch. There is one ring buffer per source switch. The FIIF adds a monotonically increasing sequence number to all packets destined for a destination switch. The sequence number is inserted after the header, but before the first packet data. There is a single sequence number for each frame that crosses the fabric. The sequence number is used to determine the offset in to the ring buffer.

When a packet is received with a sequence number of N, the packet is stored in the ROB and the sequence number is used to calculate an offset in to the ring buffer. The pointer to the top of the linked list associated with that sequence number is stored in the RB at the offset indicated, and the valid bits for that entry are incremented. The ring buffer scanning logic will detect the change of state of the valid bits, and pull the top pointer of the linked list from the RB and dequeue the packet(s).

Figure 4:
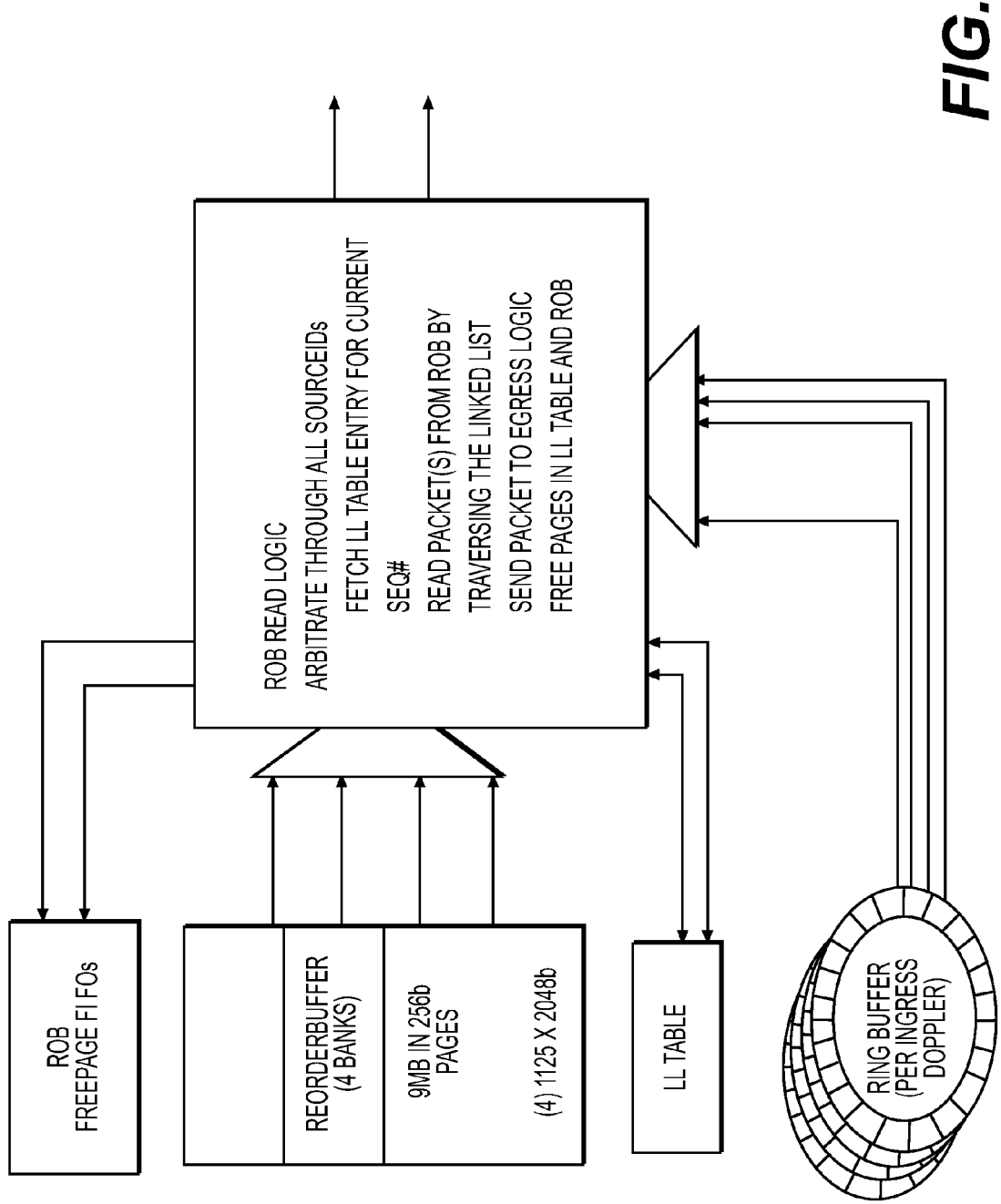
FIG. 4 is a block diagram of reorder buffer read logic, in accordance with certain disclosed embodiments.

FIG. 4 is a block diagram of reorder buffer read logic, in accordance with certain disclosed embodiments Read logic pulls entries from the LLT, pipelines reads from the ROB and queues the packets as they are sent to the EgressBuffer. ReadLogic receives LLT pointers from the RingBuffers. The next Ringbuffer is chosen via round robin arbiter. The ReadLogic fetches the LLT entry via the pointer received from the RB. The pages in the LLT entry are read from the Reorder Buffer and queued to the Egress Logic. The packet queue allocation information is pulled from the ROB Control memory and added to the queue allocationPacketInterface bus to be sent to the SQS when the packet is sent to the packet buffer.

The read logic dequeues packets for 2 channels. To avoid the possibility of out of order packets, a source switch will be locked to a specific packet buffer bus until there are no more packets in the read pipeline. This prevents situations such as a large packet with a lower sequence number on packet buffer bus 0, and then a small packet with a higher sequence number on packet buffer bus 1.

The read logic dequeues all packets associated with a sequence number in a burst, and it dequeues the entire packet.

Figure 5:
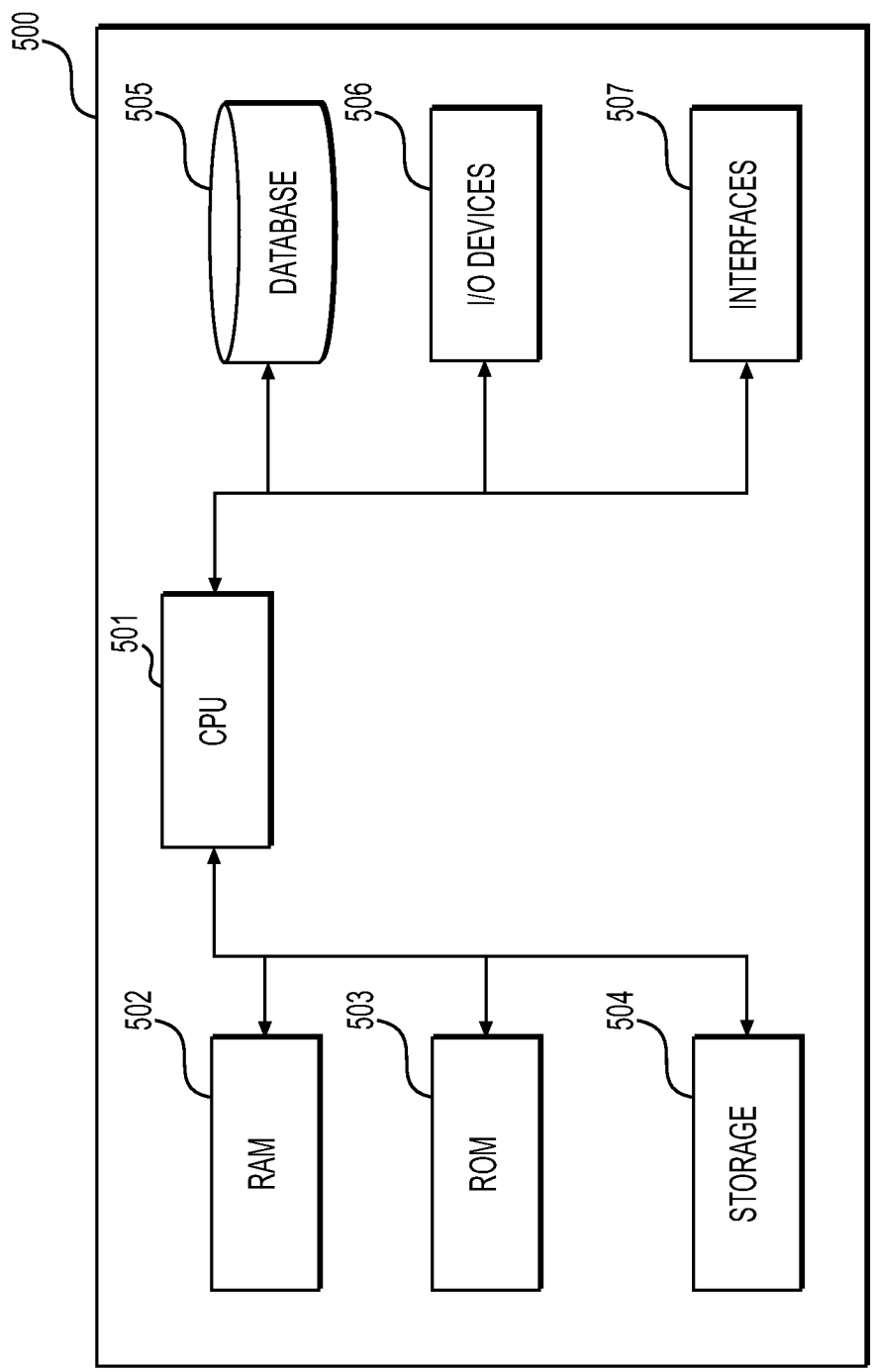
FIG. 5 provides a schematic illustration of exemplary components associated with network device, such as a switch or a router, in which methods consistent with certain disclosed embodiments may be implemented.
Figure 6:
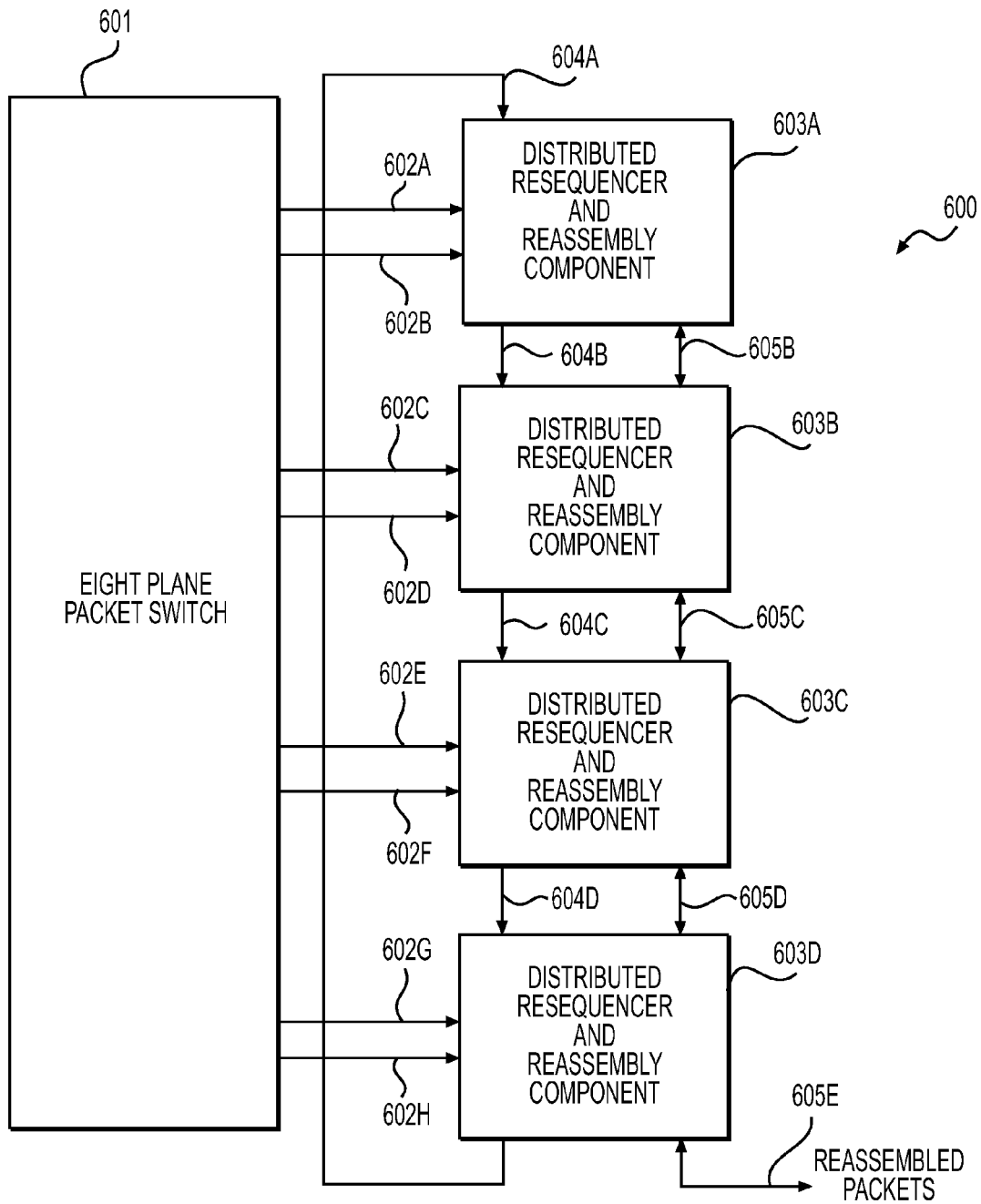
FIG. 6 is a block diagram illustrating an exemplary distributed system using four resequencing and reassembly elements.

According to one embodiment, and as illustrated in FIG. 5, one or more switches and routers that utilize the presently disclosed packet reorder process may each include or embody a processor-based networking device 500 that is configured to transport network traffic using one or more specialized communication protocols. As illustrated in FIG. 5, networking device 500 may include one or more hardware and/or software components configured to execute software programs, such as software configuring port-extended network environment and formatting data for transporting network traffic over a fabric associated with the port-extended network environment.

Such a networking device may include one or more hardware components such as, for example, a central processing unit (CPU) or microprocessor 501, a random access memory (RAM) module 502, a read-only memory (ROM) module 503, a memory or data storage module 504, a database 505, one or more input/output (I/O) devices 506, and an interface 507. Alternatively and/or additionally, networking device 500 may include one or more software media components such as, for example, a computer-readable medium including computer-executable instructions for performing methods consistent with certain disclosed embodiments. It is contemplated that one or more of the hardware components listed above may be implemented using software. For example, storage 504 may include a software partition associated with one or more other hardware components of networking device 500. Networking device 500 may include additional, fewer, and/or different components than those listed above. It is understood that the components listed above are exemplary only and not intended to be limiting.

CPU 501 may include one or more processors, each configured to execute instructions and process data to perform one or more functions associated with networking device 500. As illustrated in FIG. 5, CPU 501 may be communicatively coupled to RAM 502, ROM 503, storage 504, database 505, I/O devices 506, and interface 507. CPU 501 may be configured to execute sequences of computer program instructions to perform various processes, which will be described in detail below. The computer program instructions may be loaded into RAM 502 for execution by CPU 501.

RAM 502 and ROM 503 may each include one or more devices for storing information associated with an operation of networking device 500 and/or CPU 501. For example, ROM 503 may include a memory device configured to access and store information associated with networking device 500, including information for identifying and registering MAC addresses associated with network compatible devices. RAM 502 may include a memory device for storing data associated with one or more operations of CPU 501. For example, ROM 503 may load instructions into RAM 502 for execution by CPU 501.

Storage 504 may include any type of mass storage device configured to store information that CPU 501 may need to perform processes consistent with the disclosed embodiments. For example, storage 504 may include one or more magnetic and/or optical disk devices, such as hard drives, CD-ROMs, DVD-ROMs, or any other type of mass media device. Alternatively or additionally, storage 504 may include flash memory mass media storage or other semiconductor-based storage medium.

Database 505 may include one or more software and/or hardware components that cooperate to store, organize, sort, filter, and/or arrange data used by networking device 500 and/or CPU 501. CPU 501 may access the information stored in database 505. It is contemplated that database 355 may store additional and/or different information than that listed above.

I/O devices 506 may include one or more components configured to communicate information with a component or user associated with port-extended network environment 100. For example, I/O devices 506 may include a console with an integrated keyboard and mouse to allow a user to input parameters associated with networking device 500. I/O devices 506 may also include a display including a graphical user interface (GUI) for providing a network management console for network administrators to configure networking device 500. I/O devices 506 may also include peripheral devices such as, for example, a printer for printing information associated with networking device 500, a user-accessible disk drive (e.g., a USB port, a floppy, CD-ROM, or DVD-ROM drive, etc.) to allow a user to input data stored on a portable media device, a microphone, a speaker system, or any other suitable type of interface device. I/O devices may be configured to output network performance results.

Interface 507 may include one or more components configured to transmit and receive data via a communication network, such as the Internet, a local area network, a workstation peer-to-peer network, a direct link network, a wireless network, or any other suitable communication platform. For example, interface 507 may include one or more modulators, demodulators, multiplexers, demultiplexers, network communication devices, wireless devices, antennas, modems, and any other type of device configured to enable data communication via a communication network. According to one embodiment, interface 507 may be coupled to or include wireless communication devices, such as a module or modules configured to transmit information wirelessly using Wi-Fi or Bluetooth wireless protocols.

Figure 11:
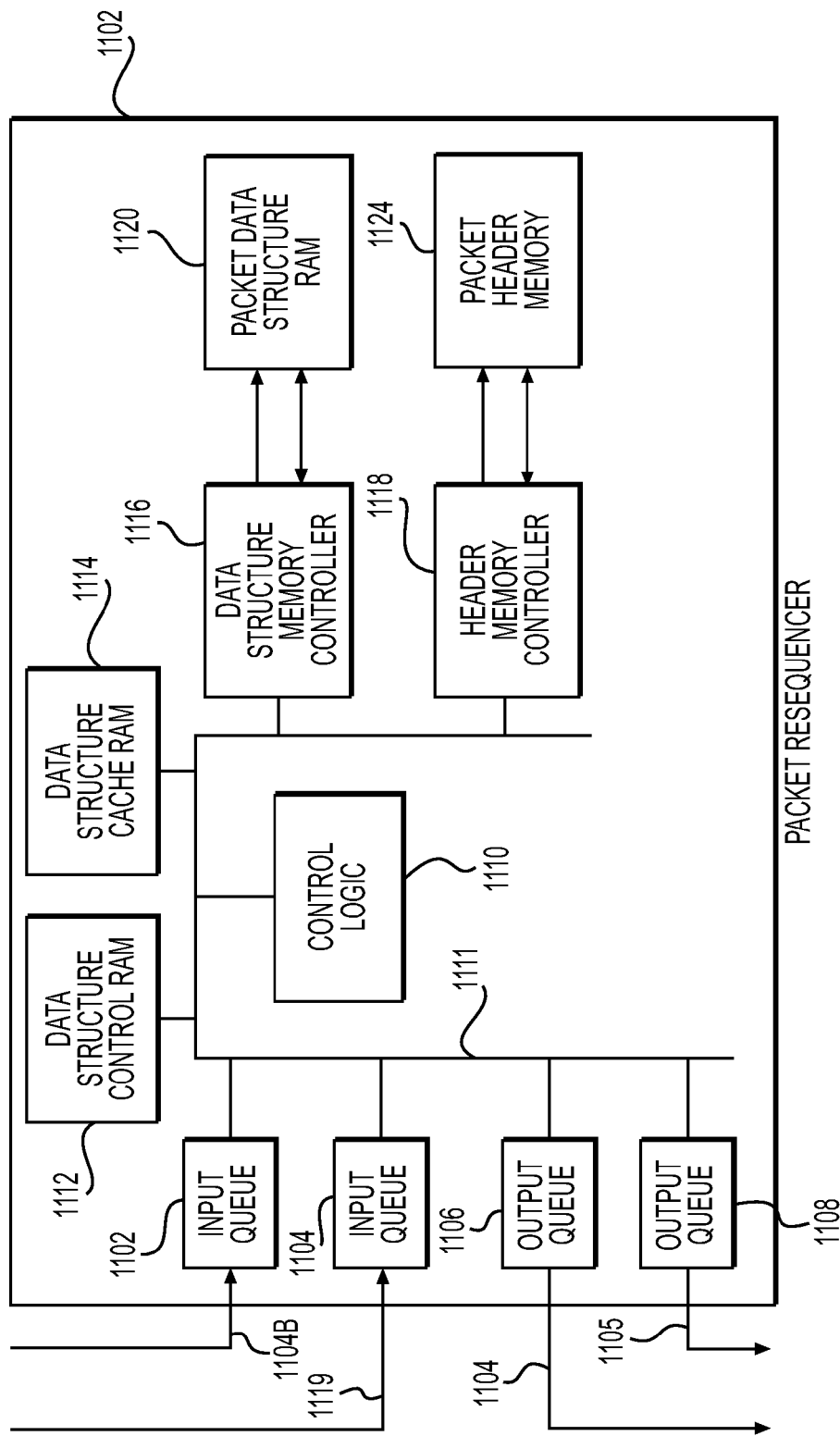
FIG. 11 is a block diagram of one embodiment of a packet resequencer.
Figure 12:
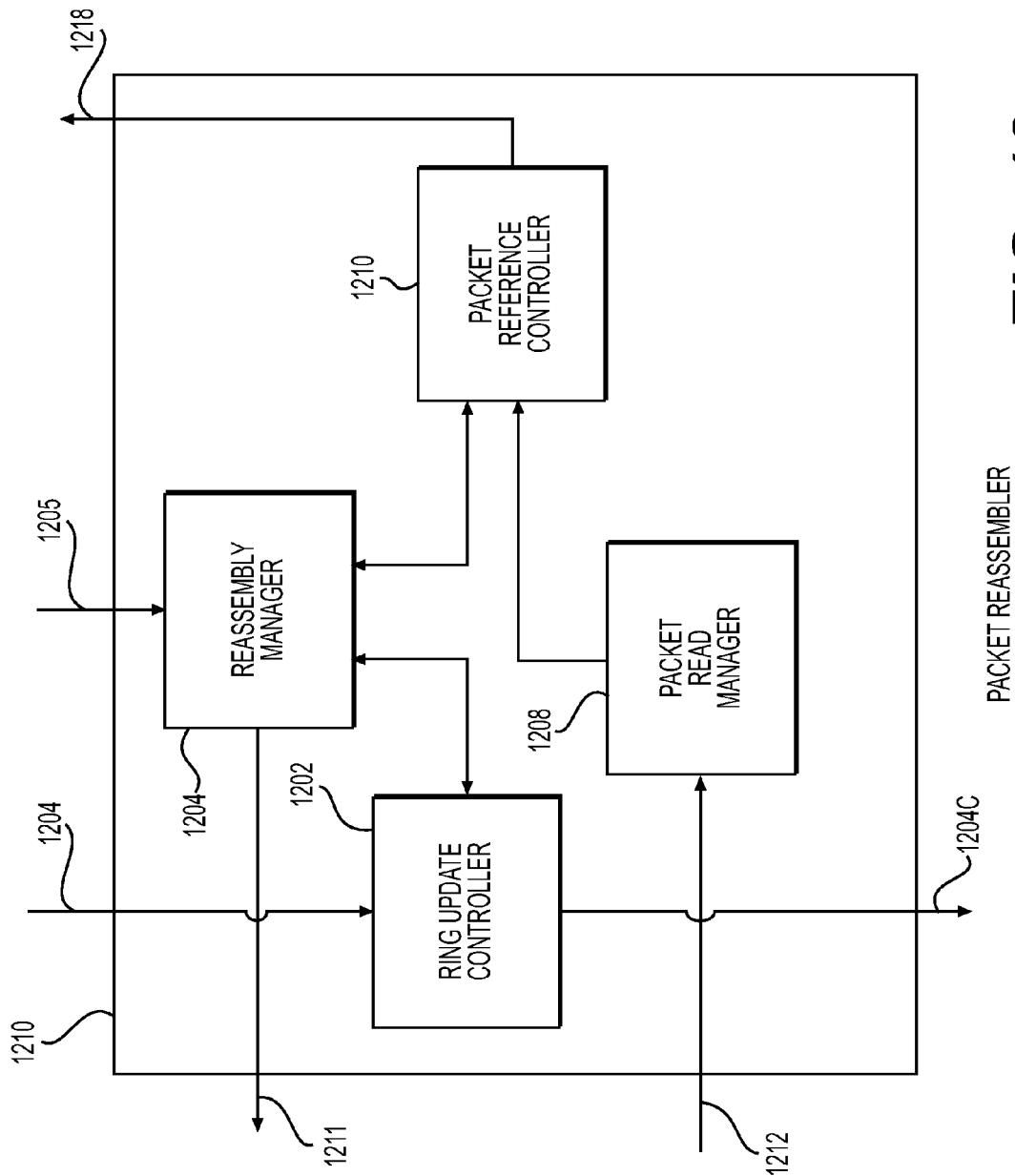
FIG. 12 is a block diagram of one embodiment of a packet reassembler.

FIG. 12 illustrates one embodiment of a mechanism for distributed resequencing and reassembly of packets in the context of a packet switching system 600. In this exemplary embodiment, packets are distributed by a packet switch 601, such as an eight plane packet switch, to four distributed resequencing and reassembly components 603A-D. In one embodiment, each of two planes of the packet switch 601 are connected to one of the distributed resequencing and reassembly components 603A-D over links 602A-H. Distributed resequencing and reassembly components 603A-D communicate and coordinate the resequencing and reassembly operations over ring 604A-D. In a coordinated fashion, distributed resequencing and reassembly components 603A-D send packets on packet merge bus 605B-E to produce the resequenced and reassembled packets. The operation of a distributed resequencing and reassembly components 603A-D are further described in relation to FIGS. 7-12.

Figure 7:
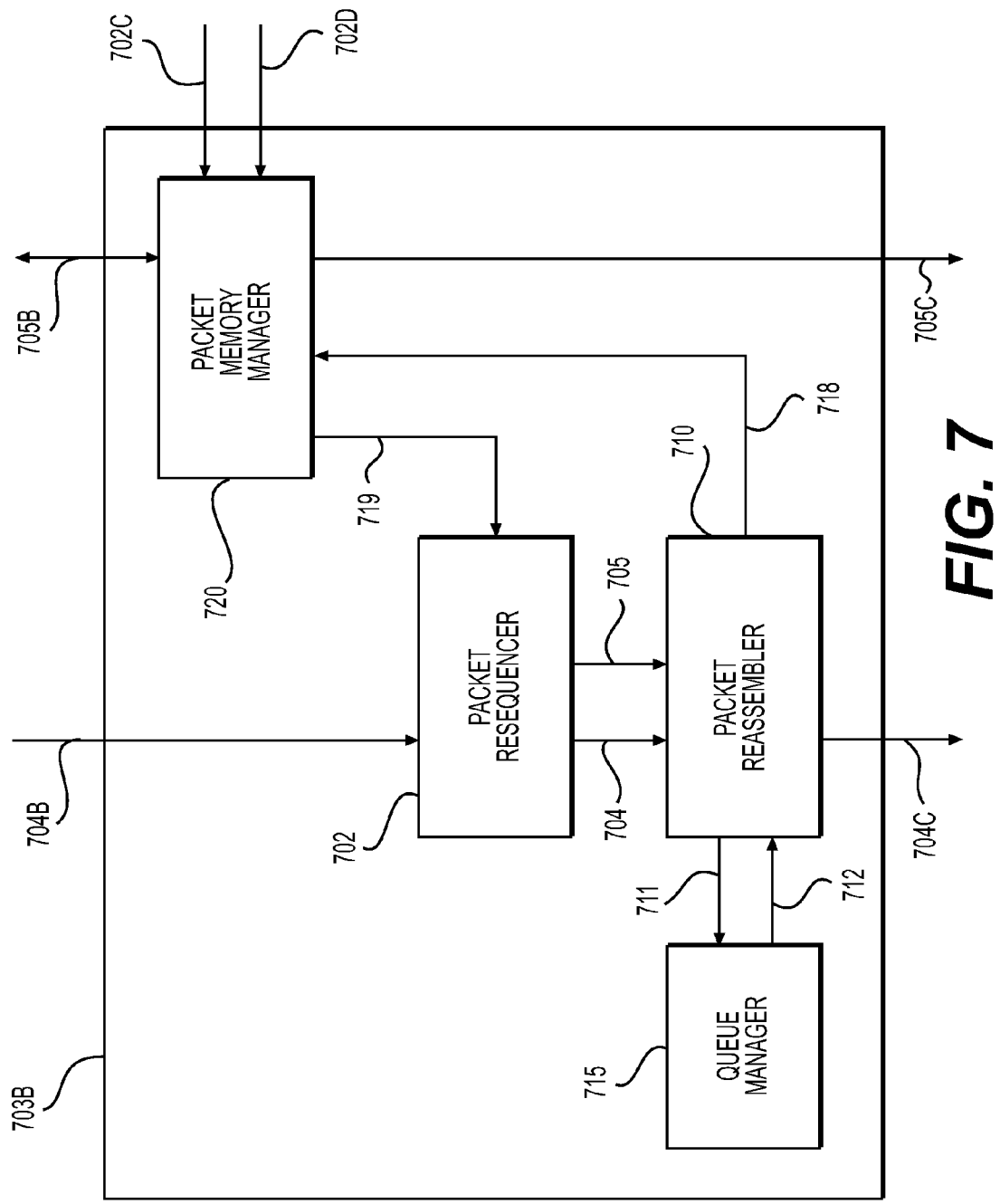
FIG. 7 is a block diagram of one embodiment of a distributed resequencing and reassembly element.
Figure 8:
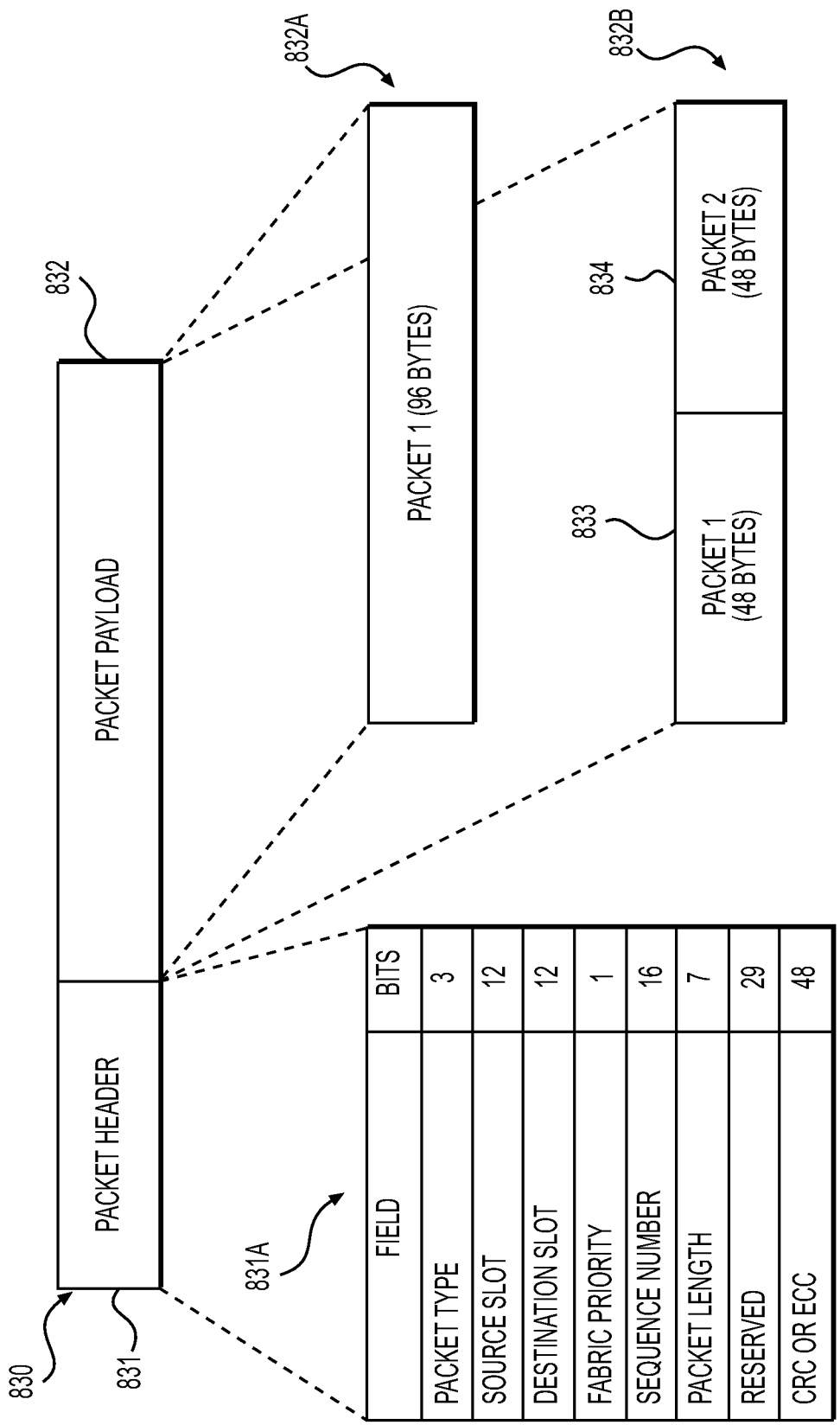
FIG. 8 illustrates an exemplary packet format used in one embodiment.

One embodiment of distributed resequencing and reassembly component 603B (FIG. 3) is shown in FIG. 7. Packets are received by the packet memory manager over links 602C-D from the packet switch 601. An exemplary format of such packets is illustrated in FIG. 8. A packet 830 includes a cell header 831 and cell payload 832. The cell header has various fields, including a packet type, source, destination, fabric priority, sequence number, packet length, reserved field, and cyclic redundancy check or error-correcting code value as illustrated in table 43 IA. The packet payload 832 may contain part or all of one or two packets (e.g., a single 96 byte packet 832A or two 48 byte packets 833-834) in a payload 832B. Of course, FIG. 8 illustrates one of numerous packet formats which may be in embodiments of the invention.

Packet memory manager 720 maintains the packet payloads and sends the received packet headers to the packet resequencer 702 over link 719. In addition, packet memory manager 720 receives a data structure representing a reassembled packet from packet reassembler 710 over link 718. Packet memory manager then retrieves from memory any packet payloads stored locally corresponding to the reassembled packet. Each of the distributed resequencing and reassembly components 603A-D places packets on the packet merge bus 605B-605E to generate the reassembled packet, which is sent out packet merge bus 605E to another component or device.

The operation of one embodiment of packet memory manager 720 is illustrated in FIG. 7. Incoming packets are received on links 602C-D and placed in incoming packet queues 713. Packets are then removed from incoming packet queues 713 and sent to the packet data memory controller 715. The packet payloads are then stored in packet data memory 717. The packet headers are simultaneously sent by packet data memory controller 715 over link 719 to packet resequencer (FIG. 7). The operation of the other elements of packet memory manager 720 will be described hereinafter in relation to the packet merge process.

Packet resequencer 702 receives these packet headers and operates in conjunction with the packet resequencers of the other distributed resequencing and reassembly components 603A,C-D. In one embodiment, packet resequencer 702 uses a local and a global data structures to resequence packets.

Figure 9:
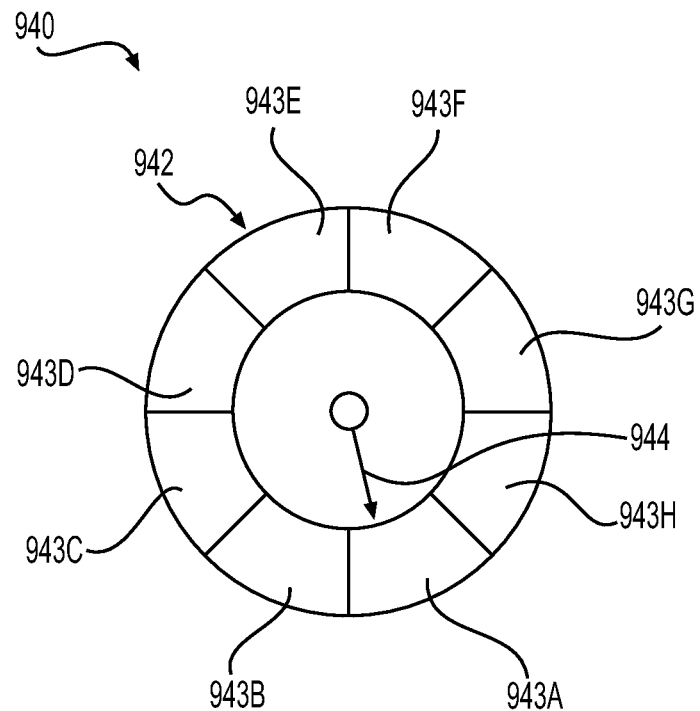
FIGS. 9-10 illustrate data structures used in resequencing packets in one embodiment.
Figure 9:
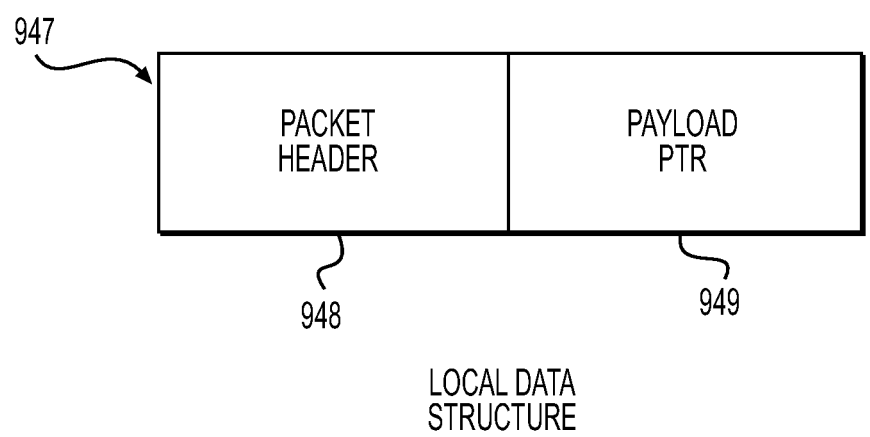
Figure 10:
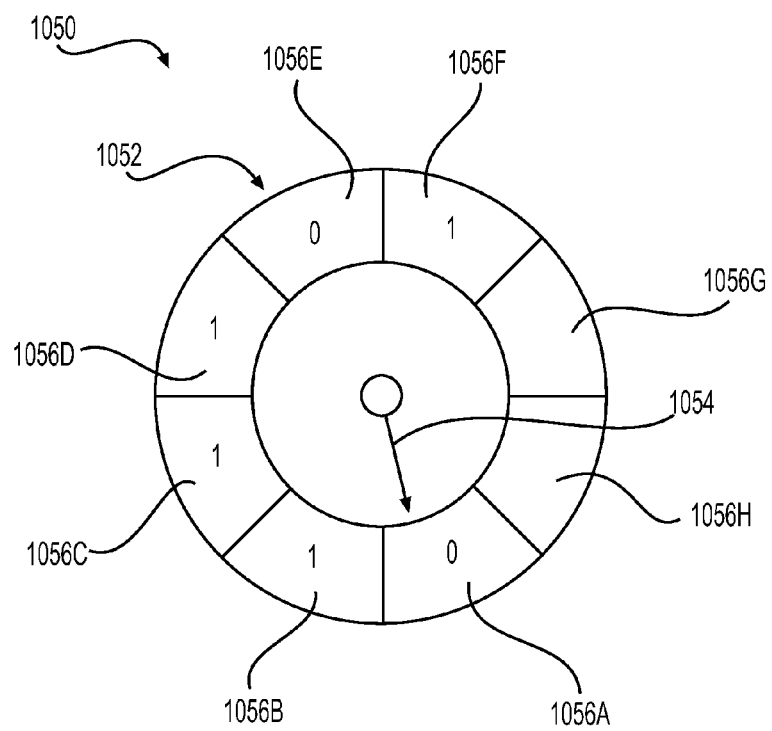

FIG. 9 illustrates one embodiment of these data structures. A local data structure 940 is used to identify packets which are received and locally stored. Local data structure 940 may take the form of a ring buffer 942 with a current position pointer 944 which is updated using the current sequence number. Ring buffer 942 could be implemented using a linked list, array, or other data structure format. Ring buffer 942 has numerous buckets 943A-H (only eight are shown for illustration convenience) with the number of buckets typically related to the size of the out of order window. An example of a bucket entry 947 includes a packet header field 948 and payload pointer field 949. The packet header field 948 will contain the received packet header fields, and the payload pointer points to the corresponding packet payload 949 stored in the packet memory manager 720. Newly received packet headers are placed in local data structure 940 at a bucket position offset from the current position pointer 944 based on the sequence number of the received packet header and the sequence number corresponding to the current position pointer 944.

A global data structure 1050 is used to identify packet headers which are stored in any of the distributed resequencer and reassembly components 603A-D (or at least the other distributed resequencer and reassembly components 603A,C-D as the locally stored packet headers are identified in local data structure 940). Global data structure 1050 may take the form of a ring buffer 1052 with a current position pointer 1054 which is updated using the current sequence number. Ring buffer 1052 could be implemented using a linked list, array, or other data structure format. Ring buffer 1052 has numerous buckets 1053A-H (only eight are shown for illustration convenience) with the number of buckets typically related to the size of the out of order window. In one embodiment, each of the buckets 1053A-H contains a binary flag to represent whether a corresponding packet header is stored in any of the distributed resequencer and reassembly components 603A-D (or at least the other distributed resequencer and reassembly components 603A,C-D).

Packet resequencer 702 coordinates its activities with the packet resequencers via the communication ring 604B, 704, 604C, and packet reassembler 710 communicates with the other packet reassembler over this ring 604B, 704, 604C. Periodically, packet resequencer 702 sends global update information to the other packet resequencers to identify the packet headers stored locally. Referencing the local and global data structures 940, 1050 (FIGS. 4C-D) to determine what packets have been received by the distributed resequencing and reassembly components 603A-D (FIG. 12), packet resequencer 702 can produce a stream of resequenced packet headers over link 705 to packet reassembler 710.

One embodiment of packet resequencer 702 is further described in relation to FIG. 11. The operation of packet resequencer 702 is controlled by control logic 1110 which is interconnected with other elements via communications link 1111. Embodiments of communications link 1111 include most any communications mechanism, such as, but not limited to a bus, fully connected mesh, point-to-point links, etc. Control logic 1110 process cell resequencing, stores and computes new resequencing state information based on information updates received from other distributed resequencer and reassembly components 603A,C-D, and sends updates to other distributed resequencer and reassembly components 603A,C-D.

Update messages representing the packets stored in the other distributed resequencer and reassembly components 603A,C-D are received over ring 604B and placed in input queue 1102, and outgoing update messages are placed in output queue 1106 and sent out over link 704. The local and global data structures 940, 1050 (FIGS. 4C-D) are updated and stored in data structure cache RAM 1114. In one embodiment, 8192 resequencing operations are simultaneously performed, with each resequencing stream allocated thirty two entries. Data structure control RAM 1112 is used to reflect the current state of the packet resequencing. Packet header information is stored in packet header memory 524, which is controlled by header memory controller 1118. Additional resequencing local and global data structures are stored in packet data structure RAM 1120, which is controlled by data structure memory controller 1116. Data structure memory controller 1116 performs memory clear, prefetch and update operations requested by control logic 1110. Referencing the maintained local and global data structures 940, 1050 (FIGS. 4C-D) to determine what packets have been received by the distributed resequencing and reassembly components 603A-D (FIG. 12), packet resequencer 702 produces a stream of resequenced packet headers which are placed in output queue 1108 and sent in order over link 705 to packet reassembler 710.

An alternative packet sequence numbering scheme is possible which typically reduces the complexity of resequencing and possibly adds some complexity at the segmentation source. This method requires each source to use the same sequence number for packets sent on each plane to the same destination. The sequence number is only incremented once a packet has been sent to each plane. Typically, the order in which packets are sent to planes is fixed and when a flow restarts it must resume sending packets to the plane after the one use to send the previous packet to that destination. The advantage this offers resequencing is each resequencing engine which manages n planes now has deterministic gap in the reassemblies (i.e., it can automatically infer what cells are going to be received by the other resequencing engines in the system). The amount of state that needs to be communicated between resequencing elements is reduced.

Packet reassembler 710 receives the stream of ordered packets over link 705 and allocates and fills data structures of reassembled packets. When this reassembly process is distributed among the distributed resequencing and reassembly components 603A-D, each of the packet assemblers must communicate and coordinate with each other. When a particular packet reassembler, such as packet reassembler 710, receives a packet header indicating the beginning of a packet to be reassembled, then the particular packet reassembler allocates a data structure with enough room for the entire reassembled packet. Because the reassembly process is distributed, the particular packet reassembler broadcasts a message to the other packet reassemblers which respond indicating if they have received the other packets comprising the packet to be reassembled.

When all these sub-packets have been received by one or more of the distributed packet reassemblers, this information is communicated to the particular packet reassembler holding the head of the packet. The data structure is then forwarded over link 711 to the corresponding queue manager, such as queue manager 715, to store the information in a queue corresponding to the destination of the reassembled packet. The operation of one embodiment of queue manager 715 is further described in relation to FIG. 8. Queue manager 715 receives the description of the reassembled packet, temporarily stores it in the incoming buffer 802, and then stores it in queue memory 806 in a queue based on its destination (and possibly priority and/or class of service). At the appropriate time, as determined by control logic 808, the queue manager extracts from one of its queues a data structure describing the corresponding reassembled packet to be send from the distributed resequencing and reassembly component 603B, and places it in outgoing buffer 804, which is then forwarded back to packet reassembler 710 over link 712.

Packet reassembler 710 receives a pointer to the data structure reflecting the reassembled packet from queue manager 715. The information in this data structure is forwarded to packet memory manager 720. Packets comprising the reassembled packet are placed on the packet merge bus 605B-E at the appropriate time to generate the reassembled packet out packet merge bus 605E.

The operation of one embodiment of packet reassembler 710 is further described in relation to FIG. 12. A stream of resequenced packet headers is received over link 705 by reassembly manager 604. If a received packet header is the first sub-packet of a packet, a new packet descriptor is requested from packet reference controller 610. This packet descriptor is sent, via reassembly manager 604, to the ring update controller 602 which forwards it to the other reassembly managers. If the packet header received is not the first sub-packet of a packet and there is no valid packet descriptor allocated for this packet, reassembly manager 604 waits until it receives a packet descriptor from ring update controller 602, which receives the valid packet descriptor from one of the other reassembly managers 604 in the system. Once there is a valid packet descriptor allotted for the packet, a sub-packet descriptor from the packet header is written into a packet descriptor data structure in reassembly manager 604. When the last sub-packet of a packet is received by reassembly manager 604, this information is sent to the ring update controller 602 which forwards it to the other reassembly managers 604 in the system.

The reassembly manager 604 that received the head of a packet sends the packet descriptor to the queue manager on link 711 when it receives the last sub-packet of the packet or when it receives a message from ring update controller 602 indicating that one of the other reassembly managers 604 has received the last sub-packet of the packet.

The reassembly manager 604 that received the head of a packet sends the packet descriptor to queue manager 800 over link 711 when it receives the last sub-packet of the packet or when it receives a message from ring update controller 602 indicating that one of the other reassembly managers 604 has received the last sub-packet of the packet.

When a queue manager 800 performs a de-queue operation, the packet descriptor is broadcast to all packet reassemblers 710 via ring update controller 602. Packet read manager 608 buffers these descriptors and forwards them to packet reference controller 610. Packet reference controller 610 reads the packet descriptor and sends a stream of sub-packet descriptors to packet memory manager 720 (FIG. 7) over link 718. Once all the sub-cell descriptors are sent, these packet descriptors are freed for reuse.

While this specification contains many specific implementation details, these should not be construed as limitations on the claims. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

It will be apparent to those skilled in the art that various modifications and variations can be made to the disclosed systems and methods for designating packets for customized data processing in port-extended architectures. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A method for performing packet reorder processing, the method comprising:
   receiving, at a packet receive buffer, a data packet, the packet receive buffer comprising a plurality of same-sized pages;
   storing the received data packet across a plurality of pages of the packet receive buffer;
   writing to a linked list of pointers to the plurality of pages across which the received data packet is stored, at storage of each of the plurality of pages, a pointer to a next page in which a subsequent portion of the data packet is stored;
   transmitting a pointer to the top of the linked list to a ring buffer;
   calculating an offset to the ring buffer based on a sequence number of the corresponding packet;
   storing the pointer to the top of the linked list in the calculated offset of the ring buffer;
   retrieving, upon dequeueing of the sequence number, the pointer from the ring buffer; and
   returning the plurality of pages used to store the received data packet to a free pool of pages for future use.

2. The method of claim 1, wherein a number of the plurality of pages are determined by a size of the received data packet divided by a size of the same-sized pages.

3. The method of claim 1, wherein the ring buffer includes a plurality of ring buffers, each ring buffer dedicated to a respective data flow.

4. The method of claim 1, wherein storing the received data packet across a plurality of pages includes retrieving the plurality of pages from a free pool of pages reserved for future use.

5. The method of claim 1, wherein the data packet is a segment of a packet that was decomposed into multiple packets.

6. A non-transitory computer-readable medium for use on a computer system, the non-transitory computer-readable medium including computer-executable instructions for causing the computer system to perform a method for resolving split conditions in a port-extended network, the method comprising:
   receiving, at a packet receive buffer, a data packet, the packet receive buffer comprising a plurality of same-sized pages;
   storing the received data packet across a plurality of pages of the packet receive buffer;
   writing to a linked list to a linked list of pointers to the plurality of pages across which the received data packet is stored, at storage of each of the plurality of pages, a pointer to a next page in which a subsequent portion of the data packet is stored;
   transmitting a pointer to the top of the linked list to a ring buffer;
   calculating an offset to the ring buffer based on a sequence number of the corresponding packet;
   storing the pointer to the top of the linked list in the calculated offset of the ring buffer;
   retrieving, upon dequeueing of the sequence number, the pointer from the ring buffer; and returning the plurality of pages used to store the received data packet to a free pool of pages for future use.

7. The non-transitory computer-readable medium of claim 6, wherein a number of the plurality of pages are determined by a size of the received data packet divided by a size of the same-sized pages.

8. The non-transitory computer-readable medium of claim 6, wherein the ring buffer includes a plurality of ring buffers, each ring buffer dedicated to a respective data flow.

9. The non-transitory computer-readable medium of claim 6, wherein storing the received data packet across a plurality of pages includes retrieving the plurality of pages from a free pool of pages reserved for future use.

10. A system for reclaiming memory during runtime startup, comprising a processor, configured to:
    receive, at a packet receive buffer, a data packet, the packet receive buffer comprising a plurality of same-sized pages;
    store the received data packet across a plurality of pages of the packet receive buffer;
    write to a linked list to a linked list of pointers to the plurality of pages across which the received data packet is stored, at storage of each of the plurality of pages, a pointer to a next page in which a subsequent portion of the data packet is stored;
    transmit a pointer to the top of the linked list to a ring buffer;
    calculate an offset to the ring buffer based on a sequence number of the corresponding packet;
    store the pointer to the top of the linked list in the calculated offset of the ring buffer;
    retrieve, upon dequeueing of the sequence number, the pointer from the ring buffer; and
    return the plurality of pages used to store the received data packet to a free pool of pages for future use.

11. The system of claim 10, wherein a number of the plurality of pages are determined by a size of the received data packet divided by a size of the same-sized pages.

12. The system of claim 10, wherein the ring buffer includes a plurality of ring buffers, each ring buffer dedicated to a respective data flow.

13. The system of claim 10, wherein storing the received data packet across a plurality of pages includes retrieving the plurality of pages from a free pool of pages reserved for future use.

14. The system of claim 10, wherein the data packet is a segment of a packet that was decomposed into multiple packets.

* * * * *